Patented Dec. 5, 1939

2,182,763

UNITED STATES PATENT OFFICE 2,182,763

PROCESS OF PRODUCING PHTHALOCYANINE DYESTUFFS

Fritz Muehlbauer, Ludwigshafen-on-the-Rhine, Germany, assignor to General Aniline Works, Inc., New York, N. Y., a corporation of Delaware No Drawing. Application March 17, 1937, Serial No. 131,407. In Germany June 19, 1935

2 Claims. (Cl. 260—319)

The present invention relates to a process of producing phthalocyanine dyestuffs. This application is a continuation in part of my copending application Ser. No. 84,891 filed June 12, 1936. Reference is further made to my copending application Ser. No. 131,406 which is also a continuation-in-part of my said copending application. Application Ser. No. 131,406 broadly describes and claims a process for producing phthalocyanine dyestuffs in which an aromatic ortho-dinitrile is heated with an alkali or alkaline earth metal amide or cyanamide in the presence of an alcohol, a phenol or a mercaptan which boils above 150° C.

I have found that phthalocyanine dyestuffs can be obtained in excellent yields and purity by preparing mixtures of aromatic ortho-dinitriles or their derivatives or compounds or mixtures yielding the same such as ortho-cyanbenzamide and amides or cyanamides of alkali or alkaline earth metals and organic solvents or diluents which contain no hydroxyl or mercapto groups and then heating these mixtures with monovalent or polyvalent alcohols, phenols or mercaptans.

As suitable solvents or diluents which contain no hydroxyl or mercapto groups may be mentioned for example dimethyl aniline, xylene, naphthalene, quinoline and esters, boiling above 150° C., of aliphatic or aromatic acids. As alcohols, phenols and mercaptans which may be employed according to this invention may be mentioned for example methyl, ethyl, butyl, amyl, octyl, benzyl alcohol, furthermore phenol, cresols and naphthols, glycol, polyglycols, thioglycol, thiodiglycol, glycerine, polyglycerine, dialkylolamines, trialkylolamines, sorbitol, erythritol and octodecane diol.

Generally speaking it is preferable to employ the alcohols and mercaptans in such amounts that there is about 1 molecular proportion thereof for each molecular proportion of metal amide or metal cyanamide in the mixture. In many cases, especially if polyvalent alcohols and mercaptans are employed, even smaller amounts are sufficient to initiate the reaction.

The process is preferably carried out by first initiating the reaction at comparatively low temperatures, as for example room temperature, or at moderately elevated temperatures, and first heating to higher temperatures, as for example those between 150° and 250° C., later on.

The reaction products mainly consist of the phthalocyanines containing the metal of the amide or cyanamide employed. By treating them with methanol or sulphuric acid, the phthalocyanine dyestuffs free from metal are obtained in very good yields.

The following examples will further illustrate how the said invention may be carried out in practice but the invention is not restricted to these examples. The parts are by weight.

Example 1

50 parts of phthalodinitrile are dissolved in 250 parts of dimethylaniline, 8 parts of finely pulverized sodamide (or a suspension of sodamide in dimethylaniline) are then introduced into the solution and the whole is heated to from about 70° to 80° C. After half an hour, 20 parts of amylalcohol (or 22 parts of benzyl alcohol) are allowed to drop in slowly and the temperature is raised to the boiling point of the mixture. After about 1½ hours, the greater part of the solvent is distilled off. The residue is first boiled with methanol and washed well and then boiled for some time with dilute hydrochloric acid, washed and dried. The dyestuff is thus obtained in a finely dispersed state. It has a greenish blue shade of color.

Example 2

500 parts of phthalonitrile are introduced into 2500 parts of dimethylaniline while stirring. 120 parts of sodamide are then added and 150 parts of methanol are allowed to drop in at room temperature. Before the whole amount of methanol has been added, the temperature is not allowed to rise above 60° C.; after it has been added, the mixture is heated in an oil bath to boiling (from 190° to 195° C.) whereby the main amount of methanol distills off. After boiling for two hours, the greater part of the dimethylaniline is distilled off (if necessary in vacuo) and the residue worked up as described in Example 1. A similar procedure is followed when the phthalonitrile is replaced by chlorphthalonitrile.

Example 3

100 parts of phthalonitrile are suspended in 400 parts of xylene, 24 parts of finely pulverized or suspended sodamide being then added to the suspension. 30 parts of methanol are then allowed to drop in slowly while stirring, the reaction mixture thus becoming heated and the phthalonitrile passing into solution. The whole is then heated to boiling for several hours on an oil bath. The xylene is distilled off and the dyestuff purified as described in Example 1.

Example 4

25 parts of phthalonitrile are dissolved in 50 parts of naphthalene at about 85° C. 4 parts of finely divided sodamide are then added in small portions and, without further external supply of heat, 10 parts of amyl alcohol are allowed to drop in. The whole is then heated while stirring for about two hours to about 200° C. The naphthalene is then dissolved out by means of toluene and the dyestuff purified as described in Example 1.

*Example 5*

20 parts of phthalonitrile and 8 parts of a 40 per cent suspension of sodamide in dimethylaniline are introduced into 40 parts of dimethylaniline. The whole is then heated to about 50° C. and, without further external supply of heat, 0.8 part of amyl alcohol are allowed to drop in. The temperature of the reaction mixtures rises now spontaneously to about 80° to 90° C. while large amounts of ammonia pass off. As soon as the evolution of ammonia has diminished, external heating is continued. At about 130° to 140° C. the evolution of ammonia has ceased. Now further 40 parts of dimethylaniline are added and the reaction mixture is stirred for 15 hours at 130° to 135° C. After cooling to about 90° C. the solid substances are filtered off by suction, dissolved while stirring in such an amount of hot dilute hydrochloric acid that the dimethylaniline still present is converted into its hydrochloride. The dyestuff is filtered off by suction, washed with dilute hydrochloric acid and with water and boiled once more with 1 per cent hydrochloric acid for from 1 to 2 hours. It is then filtered off by suction, washed with hot water and dried. The dyestuff, for the purpose of further purification, is dissolved in concentrated sulphuric acid, the solution being then poured onto ice and the redeposited dyestuff filtered off, washed and dried. 14 parts of the phthalocyanine dyestuff free from metal are thus obtained which may be finely divided, if desired, by treatment with dispersing agents.

Instead of phthalodinitrile there may be employed equivalent amounts of nitriles of other aromatic ortho-dicarboxylic acids or of derivatives of phthalo-nitrile or of compounds or mixtures reacting in the same way such as orthocyanbenzamide, phthalic amide, phthalic imide and the like.

*Example 6*

100 parts of phthalonitrile (or 127 parts of 4-chlorphthalonitrile) are introduced into 270 parts of dimethylaniline while stirring, 35 parts of a 50 per cent suspension of sodamide in dimethylaniline being then added. The whole is then heated to 70° C. and 52 parts of thiophenol are allowed to drop in slowly while stirring vigorously. The temperature is now raised slowly while large amounts of ammonia pass off at about 120° C. After heating for from 8 to 10 hours to about 180°–190° C. the mixture is diluted after cooling with dimethylaniline, the solid substances are filtered off by suction and washed carefully with alcohol and water. The residue is then boiled with dilute hydrochloric acid, filtered off by suction after cooling, washed with dilute ammonia solution and water, and dried. The dyestuff, for the purpose of further purification, is dissolved in concentrated sulphuric acid, the solution being then poured onto ice and the redeposited dyestuff filtered off, washed and dried. The dyestuff then may be treated with dispersing agents. Its shade of color is noticeably greener compared with the dyestuff described in Example 5.

*Example 7*

20 parts of a 50 per cent suspension of sodamide in dimethylaniline are added to a mixture of 200 parts of dimethylaniline and 51 parts of phthalodinitrile. Then 15 parts of thiodiglycol ($CH_2OH.CH_2.S.CH_2.CH_2OH$) are introduced into the said solution at about 70° C. and heating is continued. At about 155° C. a vigorous reaction sets in and the temperature of the mixture spontaneously rises to from 170° to 180° C. Heating is continued at this temperature for another 2 to 3 hours. It is then diluted with dimethylaniline, whereupon the dyestuff is filtered off by suction while hot, washed with ethyl alcohol and dried.

What I claim is:

1. A process of producing phthalocyanine dyestuffs which comprises admixing phthalodinitrile with sodamide dimethylaniline and adding to the mixture thus obtained while heating an aliphatic alcohol.

2. A process of producing phthalocyanine dyestuffs which comprises admixing phthalodinitrile with sodamide and dimethylaniline and adding to the mixture thus obtained amyl alcohol while heating.

FRITZ MUEHLBAUER.